April 26, 1927.
F. SIMON
PARACHUTE
Filed Oct. 1, 1925
1,626,563
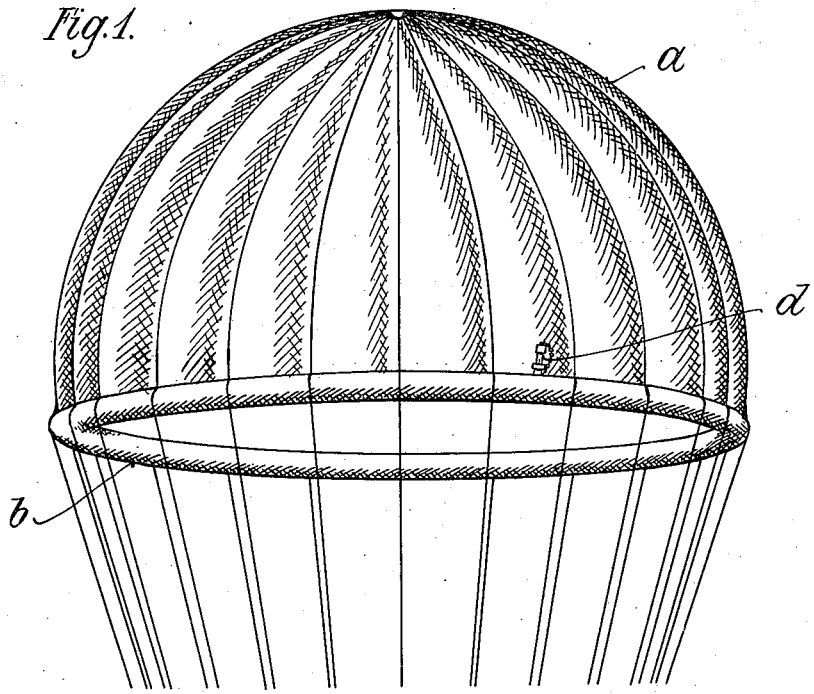
Fig.1.
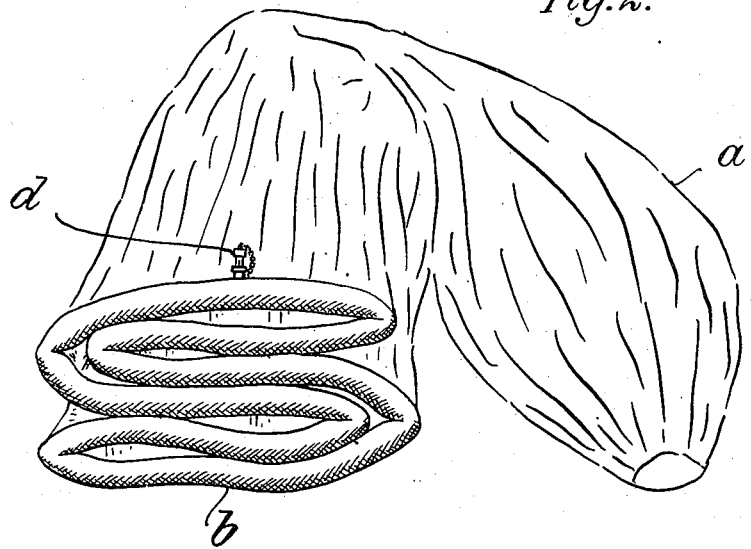
Fig.2.

Patented Apr. 26, 1927.

1,626,563

UNITED STATES PATENT OFFICE.

FRIEDRICH SIMON, OF FREIBURG-BREISGAU, GERMANY.

PARACHUTE.

Application filed October 1, 1925, Serial No. 59,874, and in Germany November 12, 1924.

This invention relates to a parachute of that type in which on the lower edge of the parachute a pneumatic tyre is arranged. Parachutes with pneumatic tyre at the edge designed to accelerate the opening of the parachute are known per se but the tyre is connected with a reservoir for compressed air by flexible tubes or the like so that they are filled with compressed air only during the fall owing to the automatic opening of the valves.

This arrangement presents the inconvenience that it might happen that any of the elements designed for the subsequent filling of the air tyre, the reservoir for the compressed air, valves, heavy masses or others, fail at the correct moment so that the unfolding of the parachute is not executed with perfect certainty. The apparatus necessitated by this arrangement is further rather expensive.

According to the invention an air tyre is used which has been moderately inflated, like the pneumatic tyre of a bicycle, prior to the start so that, when released, it will open with certainty to form a circle, the inflation being no impediment to the folding up of said tyre for storing the parachute in a state ready for use. A further advantage of this improved arrangement, besides the low cost, is that the air tyre is spread out in circular shape, without the assistance of any auxiliary means, exclusively by the action of its inner pressure, directly when the fall begins so that the unfolding of the parachute is securely started.

An embodiment of the invention is shown, by way of example, on the accompanying drawing in which—

Fig. 1 is a perspective view showing the parachute in the unfolded state.

Fig. 2 shows the parachute folded up ready for the ascent.

As shown in the drawings a pneumatic tyre $b$ is arranged at the lower edge of the parachute $a$, said tyre being enclosed in a protecting envelope connected with the parachute. To reinforce the canvas of the parachute ropes or a net are placed on the canvas the lower free ends of said ropes being attached to the belt which is designed to carry the person who uses the parachute. On the air tyre $b$ a valve of known type is mounted for inflating the tyre prior to the start or for deflating it after landing.

I claim:—

A parachute comprising a pneumatic tyre fixed on the edge of the parachute and filled with compressed air to such an extent that the moderately inflated tyre may be folded up to adapt itself to the closed parachute.

In testimony whereof I affix my signature.

FRIEDRICH SIMON.